US011255721B2

(12) United States Patent
Chen

(10) Patent No.: US 11,255,721 B2
(45) Date of Patent: Feb. 22, 2022

(54) LIGHT SENSOR HAVING ADAPTIVELY CONTROLLED GAIN

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 416 days.

(21) Appl. No.: 16/518,225

(22) Filed: Jul. 22, 2019

(65) Prior Publication Data

US 2020/0292380 A1   Sep. 17, 2020

(30) Foreign Application Priority Data

Mar. 11, 2019 (TW) .................................. 108108091

(51) Int. Cl.
*G01J 1/42* (2006.01)

(52) U.S. Cl.
CPC ............ *G01J 1/4204* (2013.01); *G01J 1/4209* (2013.01); *G01J 2001/4238* (2013.01)

(58) Field of Classification Search
CPC ............... G01J 1/4204; G01J 1/4209; G01J 2001/4238; G01J 1/1626; G01J 2001/4406; G01J 1/0233; G01J 1/46; G01J 1/0228; G01J 1/44; G01J 2001/444
See application file for complete search history.

(56) References Cited

U.S. PATENT DOCUMENTS

| | | | | |
|---|---|---|---|---|
| 2006/0097136 | A1* | 5/2006 | Baxter | G01J 1/46 250/2 UAL |
| 2011/0290987 | A1* | 12/2011 | Liu | H03K 4/50 250/2 UAL |
| 2015/0102209 | A1* | 4/2015 | Xu | G01J 1/44 250/214 LS |

* cited by examiner

*Primary Examiner* — Thanh Luu
*Assistant Examiner* — Monica T Taba
(74) *Attorney, Agent, or Firm* — Li & Cai Intellectual Property (USA) Office

(57) ABSTRACT

A light sensor having an adaptively controlled gain includes a photoelectric element, an operational amplifier, a comparator, an adaptive gain control circuit, a variable capacitor and a pulse accumulator circuit. The photoelectric element converts light energy into a photocurrent. The operational amplifier outputs an error amplified signal based on a gain multiplied by a voltage difference between an input voltage and a reference voltage. The comparator compares the error amplified signal with a voltage of a reference voltage source to output a comparison signal. The adaptive gain control circuit includes a pulse detector circuit and a gain control circuit. The pulse detector circuit detects the comparison signal and a clock signal to output a pulse detected signal. The adaptive gain control circuit outputs a capacitance modulating signal according to the pulse detected signal. A capacitance of the variable capacitor is modulated according to the capacitance modulating signal.

9 Claims, 8 Drawing Sheets

LIGHT SENSOR HAVING ADAPTIVELY CONTROLLED GAIN

CROSS-REFERENCE TO RELATED PATENT APPLICATION

This application claims the benefit of priority to Taiwan Patent Application No. 108108091, filed on Mar. 11, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensor, and more particularly to a light sensor having an adaptively controlled gain.

BACKGROUND OF THE DISCLOSURE

Consumer electronic products such as cell phones are applied with more and more sensors, thereby saving power consumption and enabling a user to interact with the electronic products. For example, the latest mobile phone uses more than ten sensors. Therefore, a method for integrating the sensors under the condition of low power consumption, an occupied space and costs is positively researched by engineers.

An ambient light sensor is used to sense change in an ambient light source, and a brightness of a panel of the cell phone is accordingly adjusted. The lower the light intensity of the ambient light source is, the lower the brightness of the panel is adjusted to, thereby preventing eyes of the user from being irritated by the panel. On contrary, the higher the light intensity of the ambient light source is, the higher the brightness of the panel is adjusted to so as to improve visibility of the user. The power consumption can be reduced such that a usable time of the cell phone is extended by adjusting the brightness of the panel according to the ambient light source. A proximity sensor is a non-contact object detection sensor. The proximity sensor may be applied to a mobile device such as the cell phone. For example, the cell phone may have an anti-touch function that is carried out when the user answers the cell phone. When the user answers the cell phone and moves his or her head to a position that is too close to the panel of the cell phone, a touch function of the cell phone is turned off, thereby preventing some functions of the cell phone from being inadvertently triggered by a face of the user being in contact with the panel. As described above, the optical systems such as the ambient light sensor and the proximity sensor are used for sensing the light intensity of the ambient light. Therefore, the ambient light sensor and the proximity sensor are often integrated into a package structure. Under this condition, the integrated sensors may share the same space, consumables and supplied power with each other.

SUMMARY OF THE DISCLOSURE

In response to the above-referenced technical inadequacies, the present disclosure provides a light sensor having an adaptively controlled gain. The light sensor includes a photoelectric element, an operational amplifier, a comparator, an adaptive gain control circuit, a variable capacitor and a pulse accumulator circuit. The photoelectric element is configured to convert light energy illuminating through the photoelectric element into a photocurrent. The operational amplifier has a first amplifier input terminal and a second amplifier input terminal respectively connected to the photoelectric element and a reference voltage source. The operational amplifier is configured to output an error amplified signal based on a voltage difference between a voltage of the first amplifier input terminal and a voltage of the reference voltage source and a gain of the operational amplifier. The comparator has a first comparator input terminal and a second comparator input terminal respectively connected to an output terminal of the operational amplifier and the reference voltage source. The comparator is configured to compare a voltage of the error amplified signal with the voltage of the reference voltage source to output a comparison signal. The adaptive gain control circuit is connected to an output terminal of the comparator. The adaptive gain control circuit includes a pulse detector circuit and a gain control circuit. The pulse detector circuit is connected to an external electronic circuit and the output terminal of the comparator. The pulse detector circuit is configured to detect the comparison signal from the comparator to output a pulse detected signal and detect a clock signal from the external electronic circuit to output a clock detected signal. The gain control circuit is connected to the pulse detector circuit and configured to output a capacitance modulating signal according to the pulse detected signal. The variable capacitor is connected between the output terminal of the operational amplifier and the first comparator input terminal and connected to the gain control circuit, and the variable capacitor having a target capacitance that is modulated from an original capacitance according to the capacitance modulating signal. The pulse accumulator circuit is connected to the output terminal of the comparator and configured to count the number of times that a voltage of the first comparator input terminal increases to be higher than the voltage of the reference voltage source from a voltage value lower than the voltage of the reference voltage source according to the comparison signal.

As described above, the present disclosure provides the light sensor having the adaptively controlled gain, which includes the adaptive gain control circuit for adjusting the capacitance of the variable capacitor and/or the current of the variable current source. As a result, the time length required for charging the variable capacitor by the photocurrent that is converted from the ambient light energy by the photoelectric element is adjusted. Therefore, when the light sensor is irradiated by the ambient light source having the low light intensity, the capacitance of the variable capacitor and/or the current of the variable current source are reduced such that the time length of charging the variable capacitor is shortened, thereby improving a light sensing efficiency of the light sensor. In addition, when the light sensor is irradiated by the ambient light source having high or sharply changing light intensity, the capacitance of the variable capacitor and/or the current of the variable current source are increased, such that the time length of charging the variable capacitor is extended. Therefore, the light sensor more can accurately count the number of the waveforms. An electronic device applied with such light sensor can more accurately determine a required resolution of a display screen of the electronic device under the preset light intensity of the ambient light source such that an image can be displayed on the display screen with a desired brightness.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
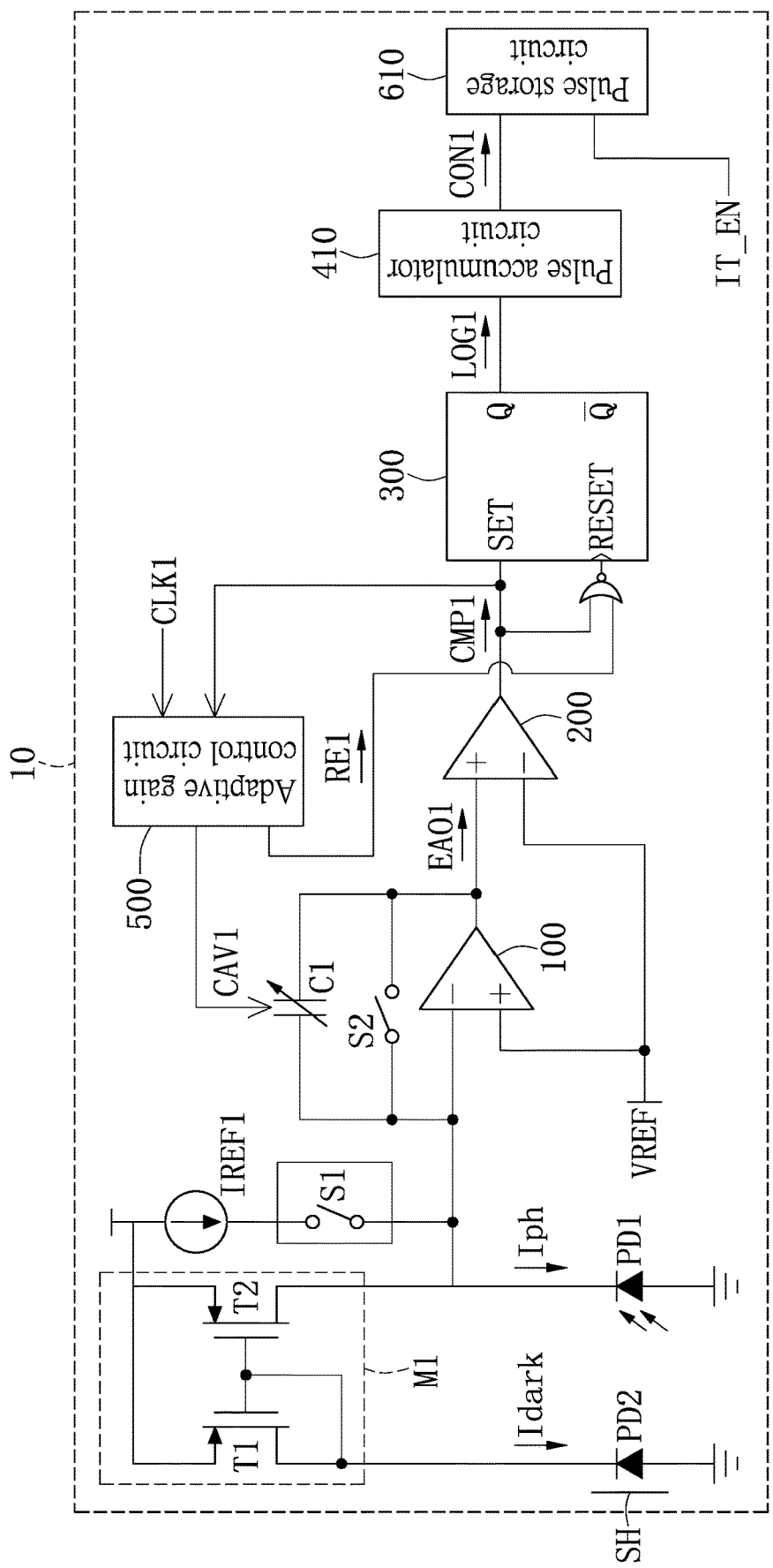
FIG. 1 is a circuit layout diagram of a light sensor having an adaptively controlled gain according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a light sensor having an adaptively controlled gain according to a first embodiment of the present disclosure. As shown in FIG. 1, a light sensor 10 having the adaptively controlled gain includes a photoelectric element PD1, an operational amplifier 100, a comparator 200, a logic circuit 300, a pulse accumulator circuit 410, an adaptive gain control circuit 500, a pulse storage circuit 610, a variable capacitor C1 and a non-variable current source IREF1.

The operational amplifier 100 has a first amplifier input terminal such as an inverting terminal and a second amplifier input terminal such as a non-inverting terminal. The first amplifier input terminal of the operational amplifier 100 is connected to a negative terminal of the photoelectric element PD1. The second amplifier input terminal of the operational amplifier 100 is connected to a reference voltage source VREF. A positive terminal of the photoelectric element PD1 is grounded.

The photoelectric element PD1 is configured to convert an ambient light energy irradiating through the photoelectric element PD1 into a photocurrent Iph. The discharged photocurrent Iph flows to the variable capacitor C1 disposed between the first amplifier input terminal and an output terminal of the operational amplifier 100 such that a voltage of the output terminal of the operational amplifier 100 is increased.

The operational amplifier 100 is configured to calculate a voltage difference between a voltage of the first amplifier input terminal of the operational amplifier 100 and a voltage of the reference voltage source VREF at the second amplifier input terminal of the operational amplifier 100. The operational amplifier 100 is configured to then multiply the voltage difference by a gain of the operational amplifier 100 to output an error amplified signal EAO1 to the comparator 200.

The comparator 200 has a first comparator input terminal such as a non-inverting terminal, which is connected to the output terminal of the operational amplifier 100. The comparator 200 has a second comparator input terminal such as an inverting terminal, which is connected to the reference voltage source VREF. The comparator 200 is configured to receive the error amplified signal EAO1 from the operational amplifier 100 and a reference voltage signal from the reference voltage source VREF. The comparator 200 then determines a voltage difference between a voltage of the error amplified signal EAO1 and a voltage of the reference voltage signal to output a comparison signal CMP1.

For example, the first comparator input terminal of the comparator 200 is the non-inverting terminal, and the second comparator input terminal of the comparator 200 is the inverting terminal. Under this condition, when the comparator 200 determines that the voltage of the error amplified signal EAO1 is higher than the voltage of the reference voltage signal, the comparator 200 outputs the comparison signal CMP1 at a high level. Conversely, when the comparator 200 determines that the voltage of the error amplified signal EAO1 is lower than the voltage of the reference voltage signal of the reference voltage source VREF, the comparator 200 outputs the comparison signal CMP1 at a low level.

An input terminal of the adaptive gain control circuit 500 may be connected to an output terminal of the comparator 200 and connected or contacted with the variable capacitor C1. The adaptive gain control circuit 500 may receive a clock signal CLK1 from an external electronic circuit such as an external clock circuit. In addition, when or before the comparison signal CMP1 is outputted to the logic circuit 300 from the comparator 200, the adaptive gain control circuit 500 may receive the comparison signal CMP1 from the comparator 200.

The adaptive gain control circuit 500 may compare the comparison signal CMP1 from the comparator 200 with the clock signal CLK1, and accordingly determine whether or not a capacitance of the variable capacitor C1 needs to be modulated. The variable capacitor C1 is connected to the adaptive gain control circuit 500. When the adaptive gain control circuit 500 determines that the capacitance of the variable capacitor C1 needs to be modulated, the adaptive gain control circuit 500 may output a capacitance modulating signal CVA1 to the variable capacitor C1 to modulate the capacitance of the variable capacitor C1.

In detail, the variable capacitor C1 may include capacitor units each including capacitor electrodes and a metal dielectric film interposed between the capacitor electrodes. The capacitance of the variable capacitor C1 may be varied with a control voltage applied to the capacitor electrodes. Therefore, the above capacitance modulating signal CVA1 may be a voltage control signal. Alternatively, the adaptive gain control circuit 500 may be connected or contacted with the variable capacitor C1. The adaptive gain control circuit 500 may perform a physical operation on the variable capacitor C1 to physically adjust the capacitance of the variable capacitor C1. Alternatively, the variable capacitor C1 may include capacitor units each including a switch. The switches of the capacitor units may be respectively controlled by the capacitance modulating signal CVA1 such that an equivalent capacitance of the capacitor units increases or decreases. A charging time that the photocurrent Iph generated by the photoelectric element PD1 discharges the variable capacitor C1 to reach a target voltage by the operational amplifier 100 varies with the capacitance of the variable capacitor C1. As a result, a time that the voltage of the error amplified signal EAO1 increases to be higher than the voltage of the reference voltage source VREF from a voltage value lower than the voltage of the reference voltage source VREF may be shortened. Under this condition, the number of times that the comparison signal CMP1 at a high level is outputted by the comparator 200 when the voltage of the error amplified signal EAO1 increases to be higher than the voltage of the reference voltage source VREF can be increased within the same preset time.

A set terminal SET of the logic circuit 300 is connected to the output terminal of the comparator 200 and configured to receive the comparison signal CMP1 from the comparator 200. It should be understood that the error amplified signal EAO1 generated by the operational amplifier 100 after the capacitance of the variable capacitor C1 is modulated is different from the error amplified signal EAO1 generated before the capacitance of the variable capacitor C1 is modulated.

The logic circuit 300 may be an SR flip flop or other suitable logic circuit elements, the present disclosure is not limited thereto. The logic circuit 300 is connected between the comparator 200 and the pulse accumulator circuit 410. The logic circuit 300 may have the set terminal SET, a reset terminal RESET, an output terminal Q and an output terminal Q. The logic circuit 300 is configured to convert the comparison signal CMP1 from the comparator 200 into a logic signal LOG1 to be outputted to the pulse accumulator circuit 410.

For example, when the logic circuit 300 receives the comparison signal CMP1 at a high level from the comparator 200, the logic circuit 300 outputs the logic signal LOG1 at a high level to the pulse accumulator circuit 410. Conversely, when the logic circuit 300 receives the comparison signal CMP1 at a low level from the comparator 200, the adaptive gain control circuit 500 outputs a reset signal RE1 at a low level and then the logic circuit 300 outputs the logic signal LOG1 at a low level to the pulse accumulator circuit 410.

The pulse accumulator circuit 410 is connected to the output terminal Q of the logic circuit 300. The pulse accumulator circuit 410 is configured to count the number of times that a voltage of the first comparator input terminal of the comparator 200 increases to be higher than the voltage of the reference voltage source VREF from the voltage value smaller than the voltage of the reference voltage source VREF, according to the logic signal LOG1 received from the logic circuit 300.

The reset terminal RESET of the logic circuit 300 is connected to the comparator 200 and the adaptive gain control circuit 500 through a NOR gate. In detail, one input terminal of the NOR gate is connected to the output terminal of the comparator 200 and the other input terminal of the NOR gate is connected to an output terminal of the adaptive gain control circuit 500. After the adaptive gain control circuit 500 determines that the logic circuit 300 has completed the above operation according to a time point at which the adaptive gain control circuit 500 receives the comparison signal CMP1, the adaptive gain control circuit 500 may output the reset signal RE1 to the reset terminal RESET of the logic circuit 300 to reset the logic circuit 300.

More specifically, when the one input terminal of the NOR gate receives the comparison signal CMP1 at a low level from the comparator 200 and the other input terminal of the NOR gate receives the reset signal RE1 at a low level from the adaptive gain control circuit 500, the NOR gate generates a signal at a high level to the reset terminal RESET of the logic circuit 300 to reset the logic circuit 300.

Figure 2:
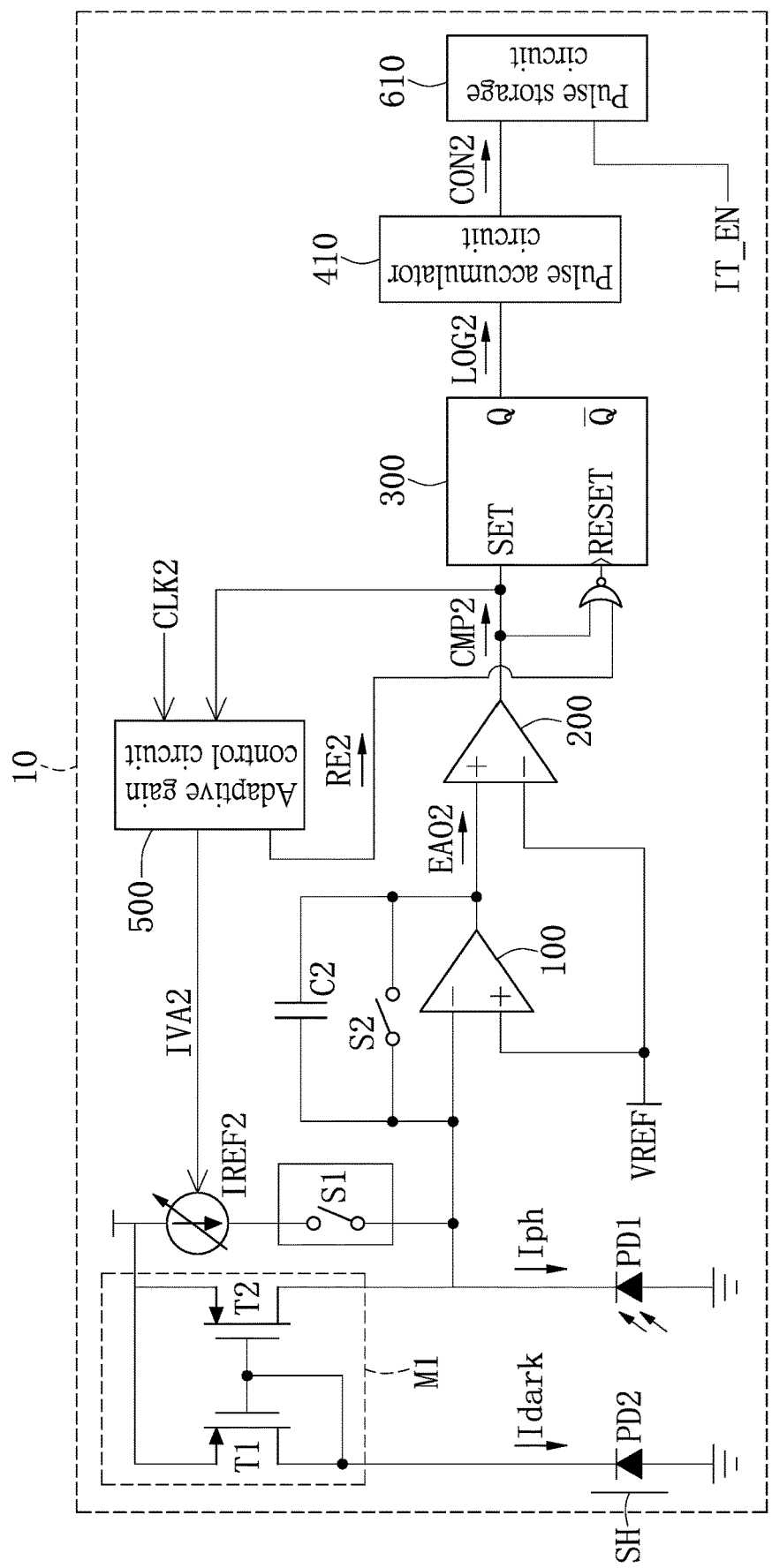
FIG. 2 is a circuit layout diagram of a light sensor having an adaptively controlled gain according to a second embodiment of the present disclosure.

Reference is made to FIG. 2, which is a circuit layout diagram of a light sensor having an adaptively controlled gain according to a second embodiment of the present disclosure. As shown in FIG. 2, the light sensor 10 having the adaptively controlled gain includes the photoelectric element PD1, the operational amplifier 100, the comparator 200, the logic circuit 300, the pulse accumulator circuit 410, the adaptive gain control circuit 500, a non-variable capacitor C2, a variable current source IREF2, the pulse storage circuit 610, and a switch element S1.

A difference between the first and second embodiments is described in the following. In the first embodiment, the light sensor 10 having the adaptively controlled gain includes the variable capacitor C1 and the non-variable current source IREF1, and the adaptive gain control circuit 500 modulates the capacitance of the variable capacitor C1 when the light intensity of the ambient light source is too high or too low. In contrast, in the second embodiment, the light sensor 10 having the adaptively controlled gain includes the non-variable capacitor C2 and the variable current source IREF2, and the adaptive gain control circuit 500 modulates a current of a current signal supplied by the variable current source IREF2.

In detail, the adaptive gain control circuit 500 may be connected to the comparator 200 and the external clock circuit. The comparator 200 may determine the voltage difference between the voltage of the first comparator input terminal such as the non-inverting terminal of the comparator 200 and the voltage of the reference voltage source VREF at the second comparator input terminal such as the inverting terminal of the comparator 200 to output a comparison signal CMP2 to the adaptive gain control circuit 500. The adaptive gain control circuit 500 may receive a clock signal CLK2 from the external clock circuit and the comparison signal CMP2 from the comparator 200.

The adaptive gain control circuit 500 may be connected to the variable current source IREF2. The adaptive gain control circuit 500 may compare the clock signal CLK2 with the comparison signal CMP2 to determine the light intensity of the ambient light source. The adaptive gain control circuit 500 may determine whether or not the current supplied to the non-variable capacitor C2 from the variable current source IREF2 needs to be modulated. If the adaptive gain control circuit 500 determines that the light intensity of the ambient light source is too high or too low, the adaptive gain control circuit 500 may output a current modulating signal IVA2 to the variable current source IREF2 to modulate the current of the current signal supplied by the variable current source IREF2. The current signal may flow to the non-variable capacitor C2 through the switch element S1 being turned on to charge the non-variable capacitor C2. A charging time that the photocurrent Iph generated by the photoelectric element PD1 discharges the non-variable capacitor C2 to reach a target voltage by the operational amplifier 100 varies with the current of the variable current source IREF2. As a result, a time that a voltage of the error amplified signal EAO2 increases to be higher than the voltage of the reference voltage source VREF from a voltage value smaller than the voltage of the reference voltage source VREF may be shortened. Under this condition, the number of times CON2 that the comparison signal CMP2 at a high level is outputted by the comparator 200 when the voltage of the error amplified signal EAO2 increases to be higher than the voltage of the reference voltage source VREF can be increased.

The pulse storage circuit 610 is connected to an output terminal of the pulse accumulator circuit 410. The pulse accumulator circuit 410 counts the number of times CON2 that the voltage of the first comparator input terminal of the comparator 200 increases to be higher than the voltage of the reference voltage source VREF from the voltage value lower than the voltage of the reference voltage source VREF. The pulse storage circuit 610 may store the number of times CON2.

Figure 3:
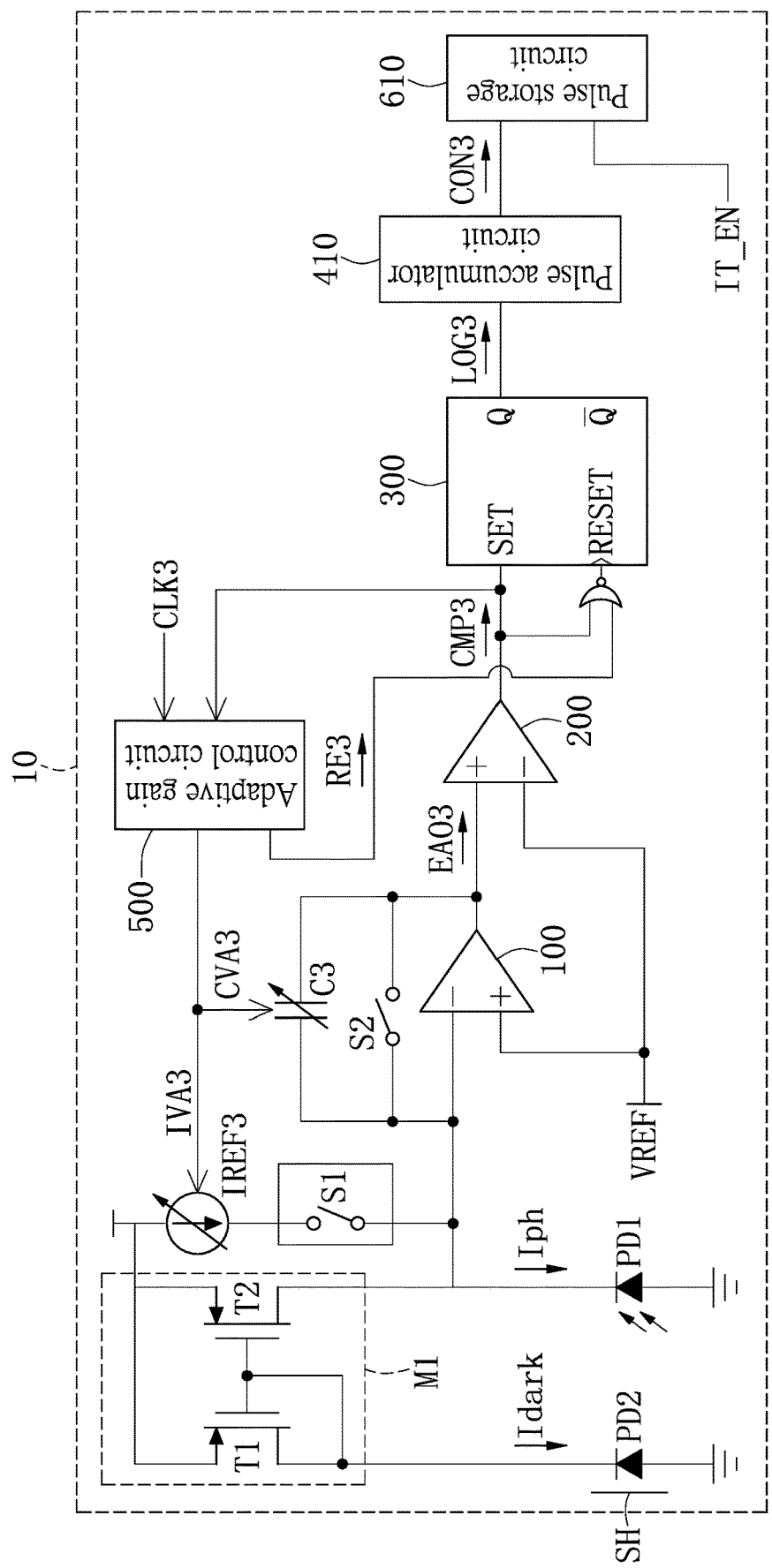
FIG. 3 is a circuit layout diagram of a light sensor having an adaptively controlled gain according to a third embodiment of the present disclosure.

Reference is made to FIG. 3, which is a circuit layout diagram of a light sensor having an adaptively controlled gain according to a third embodiment of the present disclosure. As shown in FIG. 3, the light sensor 10 having the adaptively controlled gain includes the photoelectric element PD1, the operational amplifier 100, the comparator 200, the logic circuit 300, the pulse accumulator circuit 410, the adaptive gain control circuit 500, a variable capacitor C3, a variable current source IREF3, the pulse storage circuit 610, and the switch element S1.

A difference between the first to third embodiments is described in the following. In the first embodiment, the light sensor 10 having the adaptively controlled gain includes the variable capacitor C1 and the non-variable current source IREF1. In the second embodiment, the light sensor 10 having the adaptively controlled gain includes the non-variable capacitor C2 and the variable current source IREF2. However, in the third embodiment, the light sensor 10 having the adaptively controlled gain includes the variable capacitor C3 and the variable current source IREF3.

The adaptive gain control circuit 500 is configured to compare a comparison signal CMP3 from the comparator 200 with a clock signal CLK3 from the external clock circuit, and accordingly determine whether or not a capacitance of the variable capacitor C3 and a current of the variable current source IREF3 need to be modulated such that a charging time of the variable capacitor C3 is modulated under the present light intensity of the ambient light source.

For example, when the adaptive gain control circuit 500 determines that the charging time of the variable capacitor C3 is larger than a charging time threshold according to a determination result of the comparison signal CMP3 and the clock signal CLK3, it means that the light intensity of the ambient light source is smaller than a preset light intensity. Under this condition, the adaptive gain control circuit 500 outputs a capacitance modulating signal CVA3 to the variable capacitor C3 to reduce the capacitance of the variable capacitor C3, and outputs a current modulating signal IVA3 to the variable current source IREF3 to reduce the current of a current signal provided by the variable current source IREF3, according to the comparison signal CMP3. As a result, the charging time of the variable capacitor C3 is shortened.

When the adaptive gain control circuit 500 determines that the charging time of the variable capacitor C3 is smaller than the charging time threshold according to the determination result of the comparison signal CMP3 and the clock signal CLK3, it means that the light intensity of the ambient light source is stronger than the preset light intensity, and that the light intensity of the ambient light source is larger than the preset light intensity. Under this condition, the adaptive gain control circuit 500 outputs the capacitance modulating signal CVA3 to the variable capacitor C3 to increase the capacitance of the variable capacitor C3, and outputs the current modulating signal IVA3 to the variable current source IREF3 to increase the current of the current signal provided by the variable current source IREF3, according to the comparison signal CMP3. As a result, the charging time of the variable capacitor C3 is extended.

Figure 4:
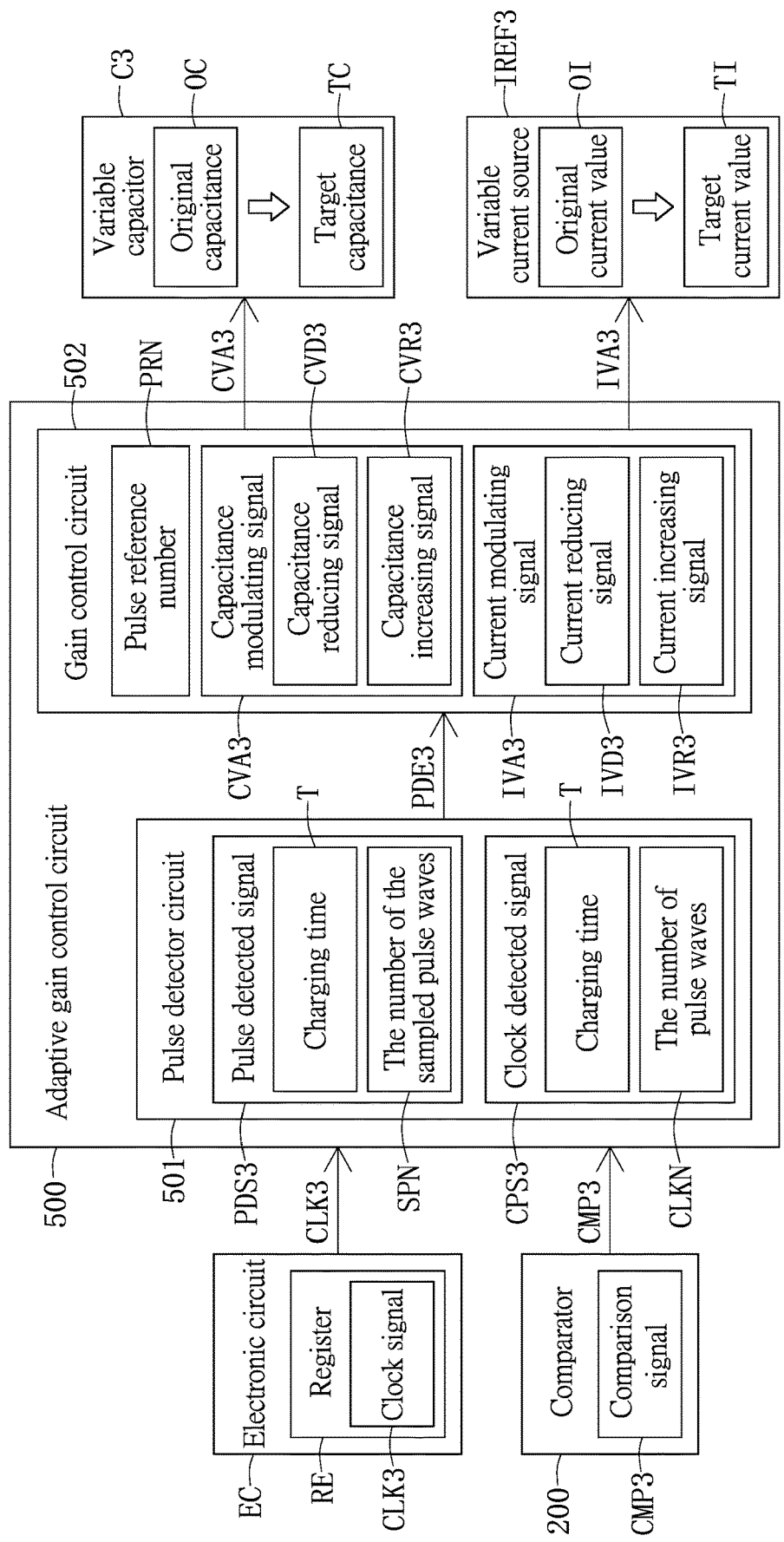
FIG. 4 is a block diagram of an adaptive gain control circuit, a comparator, a variable current source, a variable capacitor and an external electronic circuit of the light sensor having the adaptively controlled gain according to the third embodiment of the present disclosure.

Reference is made to FIG. 4, which is a block diagram of an adaptive gain control circuit, a comparator, a variable current source, a variable capacitor and an external electronic circuit of the light sensor having the adaptively controlled gain according to the third embodiment of the present disclosure. As shown in FIG. 4, the light sensor 10 having the adaptively controlled gain applied for an electronic circuit EC includes the photoelectric element, the operational amplifier, the comparator 200, the adaptive gain control circuit 500, the variable capacitor C3 and the variable current source IREF3.

For example, the electronic circuit EC may include circuit elements of a mobile device. The electronic circuit EC may include a register RE configured to store the clock signal CLK3. The clock signal CLK3 is associated with the comparison signal CMP3 generated by the comparator 200 under a normal or specific light intensity of the ambient light source that may be equal to a light intensity threshold.

Before the photoelectric element of the light sensor is irradiated by the ambient light source, the adaptive gain control circuit 500 of the light sensor may be connected to the electronic circuit EC and store the clock signal CLK3 received from the electronic circuit EC. When the photoelectric element of the light sensor is irradiated by the ambient light source, the photocurrent Iph converted from the ambient light energy by the photoelectric element PD1 discharges the variable capacitor C3 and the variable capacitor C3 is charged by the operational amplifier 100, such that the voltage of the first comparator input terminal gradually increases. When the voltage of the first comparator input terminal of the comparator 200 is higher than or equal to a reference voltage of the reference voltage source VREF at the second comparator input terminal of the comparator 200, the comparator 200 outputs the corresponding comparison signal CMP3 to the adaptive gain control circuit 500.

In detail, the adaptive gain control circuit 500 of the light sensor 10 may include a pulse detector circuit 501 and a gain control circuit 502. The pulse detector circuit 501 is connected to the register RE of the electronic circuit EC, and the comparator 200 and the gain control circuit 502 of the light sensor. The pulse detector circuit 501 is configured to detect waveform parameters of the comparison signal CMP3 from the comparator 200 to output a pulse detected signal PDS3.

In addition, when or before the pulse detector circuit 501 detects the comparator 200, the pulse detector circuit 501 is configured to detect waveform parameters of pulse wave of the clock signal CLK3 received from the register RE to output a clock detected signal CPS3 to the gain control circuit 502. The pulse detector circuit 501 outputs a detected signal PDE3 according to the pulse detected signal PDS3 and the clock detected signal CPS3 to the gain control circuit 502.

The gain control circuit 502 is connected to the variable capacitor C3 and the variable current source IREF3. The gain control circuit 502 is configured to receive the pulse detected signal PDS3 and the clock detected signal CPS3 from the pulse detector circuit 501. The gain control circuit 502 then compares the pulse detected signal PDS3 with the clock detected signal CPS3 to generate a comparison result. The gain control circuit 502 determines whether the gain control circuit 502 outputs the capacitance modulating signal CVA3 to the variable capacitor C3 to modulate an original capacitance OC of the variable capacitor C3 to a target capacitance TC, according to the comparison result. In addition, the gain control circuit 502 determines whether to output the current modulating signal IVA3 to the variable current source IREF3 to modulate an original current value OI of a current supplied by the variable current source IREF3 to a target current value TI, according to the comparison result. The pulse detector circuit 501 may store the clock signal CLK3 as a reference signal for the next comparison operation. As a result, the next detecting operation of the clock signal CLK3 can be omitted.

Figure 5:
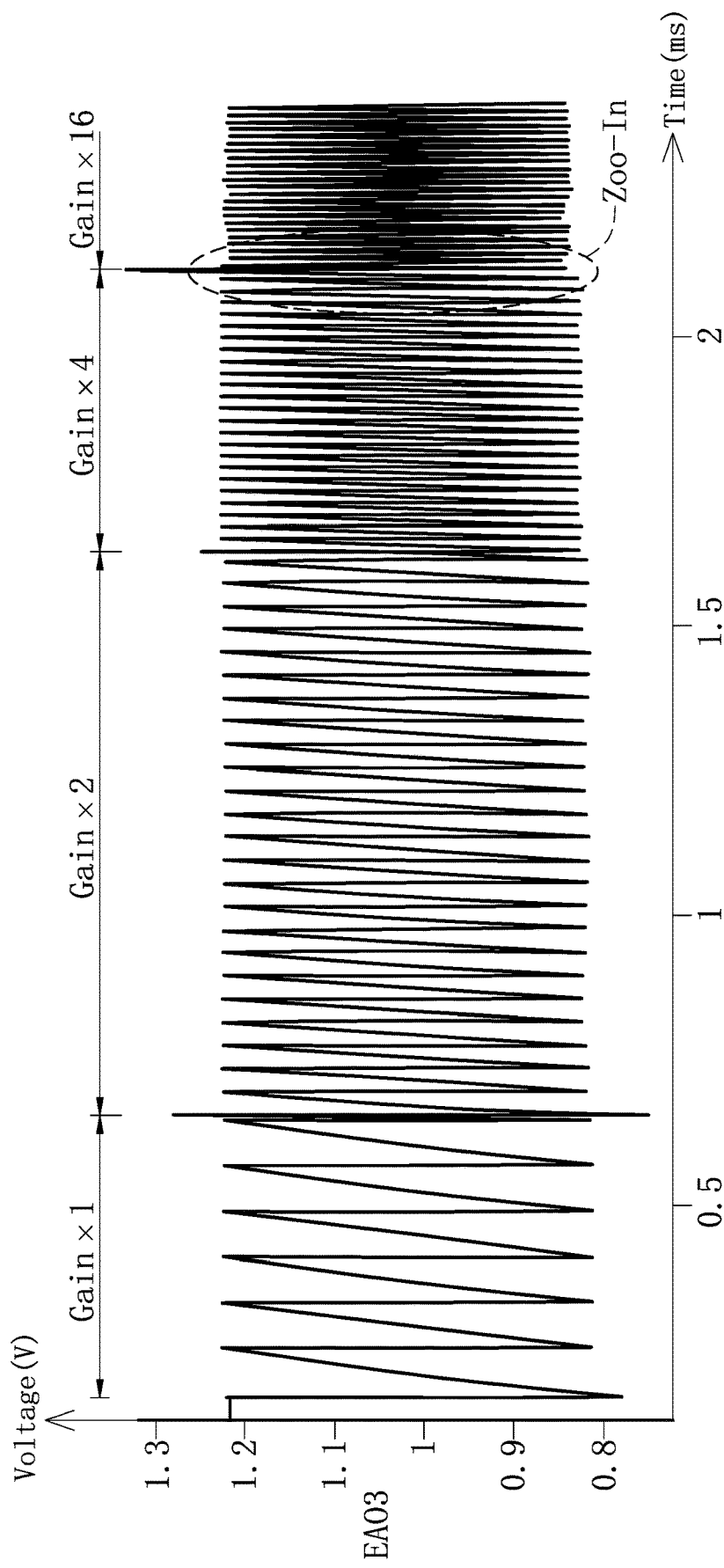
FIG. 5 is a signal waveform diagram of an error amplified signal generated by an operational amplifier when a capacitance of the variable capacitor and a current of the variable current source are modulated under a low light intensity of an ambient light source by the light sensor having the adaptively controlled gain according to the third embodiment of the present disclosure.
Figure 6:
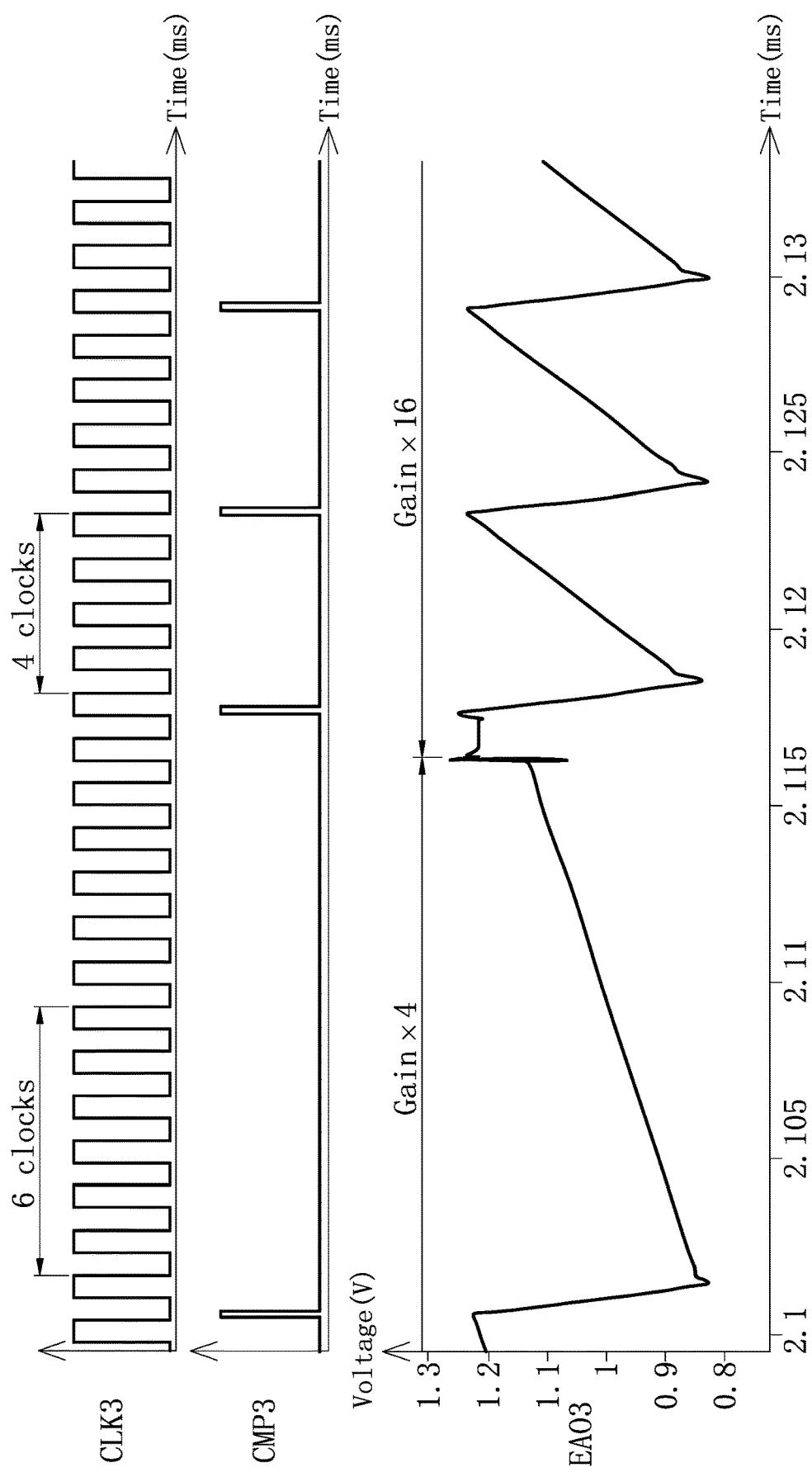
FIG. 6 is a signal waveform diagram of a clock signal received by the adaptive gain control circuit, a comparison signal generated by the comparator and the error amplified signal generated by the operational amplifier when the capacitance of the variable capacitor and the current of the variable current source are modulated under the low light intensity of the ambient light source by the light sensor having the adaptively controlled gain according to the third embodiment of the present disclosure.

Reference is made to FIGS. 3, 4, 5 and 6, wherein FIG. 5 is a signal waveform diagram of an error amplified signal generated by an operational amplifier when a capacitance of the variable capacitor and a current of the variable current source are modulated under a low light intensity of an ambient light source by the light sensor having the adaptively controlled gain according to the third embodiment of the present disclosure; FIG. 6 is a signal waveform diagram of a clock signal received by the adaptive gain control circuit, a comparison signal generated by the comparator and the error amplified signal generated by the operational amplifier when the capacitance of the variable capacitor and the current of the variable current source are modulated under the low light intensity of the ambient light source by the light sensor having the adaptively controlled gain according to the third embodiment of the present disclosure. FIG. 6 is an enlarged schematic diagram of a portion of the error amplified signal EAO3 that is circled by a dotted circle Zoo-In as shown in FIG. 5.

The operational amplifier 100 determines a voltage difference between the received input voltage and the voltage of the reference voltage source VREF. The operational amplifier 100 multiplies the voltage difference by the gain of the operational amplifier 100 to generate the error amplified signal EAO3 as shown in FIGS. 5 and 6. For convenience of explanation, each pulse wave of the error amplified signal EAO3 is defined to include a starting portion and a charging portion in the following.

First, the switch element S1 shown in FIG. 3 is turned on to allow the current provided by the variable current source IREF3 to flow to the variable capacitor C3 through the switch element S1. The photocurrent Iph converted from the ambient light energy by the photoelectric element PD1 is subtracted from the current provided by the variable current source IREF3 to obtain a remaining current flowing to the variable capacitor C3 to charge the variable capacitor C3. The voltage of the inverting input terminal of the operational amplifier 100 varies with a voltage of the variable capacitor C3. When the voltage of the inverting input terminal of the operational amplifier 100 is higher than the voltage of the reference voltage at the non-inverting input terminal of the operational amplifier 100, the starting portion of each of pulse waves of the error amplified signal EAO3 drops sharply from a peak voltage to a valley voltage as shown in FIGS. 5 and 6. A falling slope of the pulse wave depends on the remaining current obtained by subtracting the photocurrent Iph of the photoelectric element PD1 from the current of the variable current source IREF3.

Then, the switch element S1 is turned off such that the current provided by the variable current source IREF3 is not allowed to flow to the variable capacitor C3 through the switch element S1. Under this condition, only the photocurrent Iph converted from the ambient light energy by the photoelectric element PD1 flows to the variable capacitor C3 to discharge the variable capacitor C3, and the variable capacitor C3 is charged by the operational amplifier 100. The charging portion generated after the starting portion of each pulse wave of the error amplified signal EAO3 shown in FIGS. 5 and 6 is increased from the valley voltage to a voltage higher than a voltage such as 1.2V of a voltage signal supplied by the reference voltage source VREF. A rising slope and a charging rate of the charging portion of each pulse wave depend on the light intensity of the ambient light source. It should be understood that the photocurrent Iph generated by the photoelectric element PD1 is proportional to the light intensity of the ambient light source.

When the comparator 200 receives the error amplified signal EAO3 indicating that the voltage of the non-inverting terminal of the comparator 200 is higher than the reference voltage of the reference voltage source VREF at the inverting terminal of the comparator 200, the comparator 200 outputs the comparison signal CMP3 at a high level. That is, the comparison signal CMP3 has a pulse wave. The voltage of the non-inverting terminal of the comparator 200 increases to be higher than the voltage of the reference voltage source VREF from the voltage value smaller than the voltage of the reference voltage source VREF (which is the valley voltage as shown in FIG. 6), within a charging time T between every two adjacent pulse waves of the comparison signal CMP3.

The pulse detector circuit 501 of the adaptive gain control circuit 500 detects the charging time T between the two adjacent pulse waves of the comparison signal CMP3 received from the comparator 200 to output the pulse detected signal PDS3. The number SPN of the sampled pulse waves of the comparison signal CMP3 may depend on a magnitude of and a changing rate of the light intensity of the ambient light source within a predetermined time.

In addition, the adaptive gain control circuit 500 detects a time interval between two adjacent pulse waves among a plurality of same pulse waves of the clock signal CLK3 as shown in FIG. 6 from the register RE of the electronic circuit EC. The same pulse waves of the clock signal CLK3 may have the same pulse width and the same time interval between every two adjacent pulse waves. Therefore, in order to reduce a time and complexity of detecting the clock signal CLK3, the adaptive gain control circuit 500 may only sample any two adjacent pulse waves of the clock signal CLK3.

The pulse detector circuit 501 of the adaptive gain control circuit 500 may detect the number CLKN of the pulse waves of the clock signal CLK3 within the charging time T between the two adjacent pulse waves of the comparison signal CMP3 to output the clock detected signal CPS3. For example, as shown in FIG. 6, the pulse detector circuit 501 detects about twelve pulse waves in the clock signal CLK3 within the charging time T between the two adjacent pulse waves of the comparison signal CMP3.

The pulse detector circuit 501 may detect the plurality of pulse waves of the comparison signal CMP3 within a predetermined time. A time length of the predetermined time may depend on a changing rate of the light intensity of the light source of an environment in which the pulse detector circuit 501 is located. When the comparison signal CMP3 generated by the comparator 200 CMP3 includes more than two pulse waves within the predetermined time, the pulse detector circuit 501 may detect more than two pulse waves, such as four pulse waves, to obtain the number CLKN of the pulse waves of the clock signal CLK3 within the two charging times T. That is, the pulse detector circuit 501 may detect multiple times the charging times T within which the voltage of the non-inverting terminal of the comparator 200 increases to be higher than the voltage of the reference voltage source VREF from the voltage value smaller than the voltage of the reference voltage source VREF.

Further, the gain control circuit 502 of the adaptive gain control circuit 500 may store a pulse reference number PRN. The gain control circuit 502 compares the number CLKN of the pulse waves of the clock signal CLK3 within the charging time T between every two adjacent pulse waves of the comparison signal CMP3 with the pulse reference number PRN, according to the pulse detected signal PDS3 and the clock detected signal CPS3 received from the pulse detector circuit 501.

When the gain control circuit 502 determines that the number CLKN of the pulse waves of the clock signal CLK3 within the charging time T is equal to the pulse reference number PRN, the gain control circuit 502 may determine that the capacitance of the variable capacitor C3 and the current of the variable current source IREF3 do not need to be modulated.

However, when the gain control circuit 502 determines that the number CLKN of the pulse waves of the clock signal CLK3 within the charging time T is not equal to the pulse reference number PRN, the gain control circuit 502 may output the capacitance modulating signal CVA3 to the variable capacitor C3 and output the current modulating signal IVA3 to the variable current source IREF3. As a result, the original capacitance OC of the variable capacitor C3 is modulated to the target capacitance TC according to the capacitance modulating signal CVA3. The original current OI of the current signal is modulated to the target current TI according to the current modulating signal IVA3.

It is worth noting that, as shown in FIGS. 5 and 6, when the ambient light source has the lower light intensity, a longer charging time is required for the photoelectric element PD3 to discharge the variable capacitor C3 and charging the variable capacitor C3 by the operational amplifier 100. Under this condition, the gain control circuit 502 determines that the number CLKN of the pulse waves of the clock signal CLK3 within the charging time T is larger than the pulse reference number PRN. The gain control circuit 502 may output a capacitance reducing signal CVD3 to the variable capacitor C3 to reduce the capacitance of the variable capacitor C3, and output a current reducing signal IVD3 to the variable current source REF3 to reduce the current of the variable current source IREF3.

More precisely, the gain control circuit 502 may determine a difference between the pulse reference number PRN, and the number CLKN of the pulse waves of the clock signal CLK3 within the charging time T of the error amplified signal EAO3 between the every two adjacent pulse waves of the comparison signal CMP3. The gain control circuit 502 may determine modulation ranges of the capacitance of the variable capacitor C3 and the current value of the variable current source IREF3. Furthermore, the modulation range of the current of the variable current source IREF3 may correspond to the modulation range of the capacitance of the variable capacitor C3. The above pulse reference number PRN may be adjusted according to actual application requirements. It should be understood that the smaller pulse reference number PRN and the larger modulation gain GAIN may be set such that the error amplified signal EAO3 has the shorter charging time T.

For example, as shown in FIG. 5, when the number CLKN of the pulse waves of the clock signal CLK3 within the charging time T of the error amplified signal EAO3 is equal to the pulse reference number PRN, the modulation gain GAIN of the capacitance of the variable capacitor C3 and the current of the variable current source IREF3 is equal to 1.

When the number CLKN of the pulse waves of the clock signal CLK3 within the charging time T of the error amplified signal EAO3 is larger than the first pulse reference number PRN, and a difference between the number CLKN and the first pulse reference number PRN is larger than a first number threshold, the variable capacitor C3 and the variable current source IREF3 may be modulated. In detail, the variable capacitor C3 may be modulated to have half of the original capacitance thereof. That is, the original capacitance OC of the variable capacitor C3 is double the target capacitance TC of the modulated variable capacitor C3. The variable current source IREF3 may be modulated to supply half of the original current thereof. That is, the original current value OI of the variable current source IREF3 is double the target current value TI of the modulated current source IREF3. Under this condition, the waveforms of the error amplified signal EAO3, generated according to the photocurrent Iph that is converted from the ambient light energy by the photoelectric element PD1, is equivalently modulated by the modulation gain GAIN of 2.

In another example, when the number CLKN of the pulse waves of the clock signal CLK3 within the charging time T of the error amplified signal EAO3 is larger than the second pulse reference number PRN and the difference between the number CLKN and the second pulse reference number PRN is larger than a second number threshold, the variable capacitor C3 and the variable current source IREF3 may be modulated. In detail, the variable capacitor C3 may be modulated to have one quarter of the original capacitance thereof. That is, the original capacitance OC is quadruple the target capacitance TC. The current of the variable current source IREF3 may be modulated to have one quarter of the original current value. That is, the original current value OI is quadruple the target current value TI. Under this condition, the waveforms of the error amplified signal EAO3, generated according to the photocurrent Iph that is converted from the ambient light energy by the photoelectric element PD1, is equivalently modulated by the modulation gain GAIN of 4.

In yet another example, when the number CLKN of the pulse waves of the clock signal CLK3 within the charging time T of the error amplified signal EAO3 is larger than the third pulse reference number PRN and the difference between the number CLKN and the third pulse reference number PRN is larger than a third number threshold, the variable capacitor C3 and the variable current source IREF3 may be modulated. In detail, the variable capacitor C3 may be modulated to have one sixteenth of the original capacitance thereof. That is, the original capacitance OC is sixteen times the target capacitance TC. The current of the variable current source IREF3 may be modulated to have one sixteenth of the original current value. That is, the original current value OI is sixteen times the target current value TI. Under this condition, the waveforms of the error amplified signal EAO3, generated according to the photocurrent Iph that is converted from the ambient light energy by the photoelectric element PD1, is equivalently modulated by the modulation gain GAIN of 16.

FIG. 6 is an enlarged schematic diagram of the error amplified signal EAO3 generated based on the modulation gain GAIN of 4 and 16 as shown in FIG. 5. In FIG. 6, the time length of the charging time T of the error amplified signal EAO3 being modulated based on the different modulation gains GAIN of the variable capacitor C3 is clearly shown.

As shown in FIG. 6, under the modulation gain GAIN of 4, the charging time T of the error amplified signal EAO3 is relatively longer and a slope of the waveform of the error amplified signal EAO3 is relatively smaller. Under this condition, the clock signal CLK3 includes about twelve pulse waves within the charging time T between the two pulse waves of the comparison signal CMP3 generated by the comparator 200.

In contrast, under the modulation gain GAIN of 16, the charging time T of the error amplified signal EAO3 is relatively short and the slope of the waveform of the error amplified signal EAO3 is relatively large. Under this condition, the clock signal CLK3 includes about four pulse waves within the charging time T between the two pulse waves of the comparison signal CMP3 generated by the comparator 200. It is apparent that the larger the modulation gain GAIN is, the smaller the capacitance of the capacitor C3 and the current of the variable current source IREF3 are, and the shorter the charging time T is.

Figure 7:
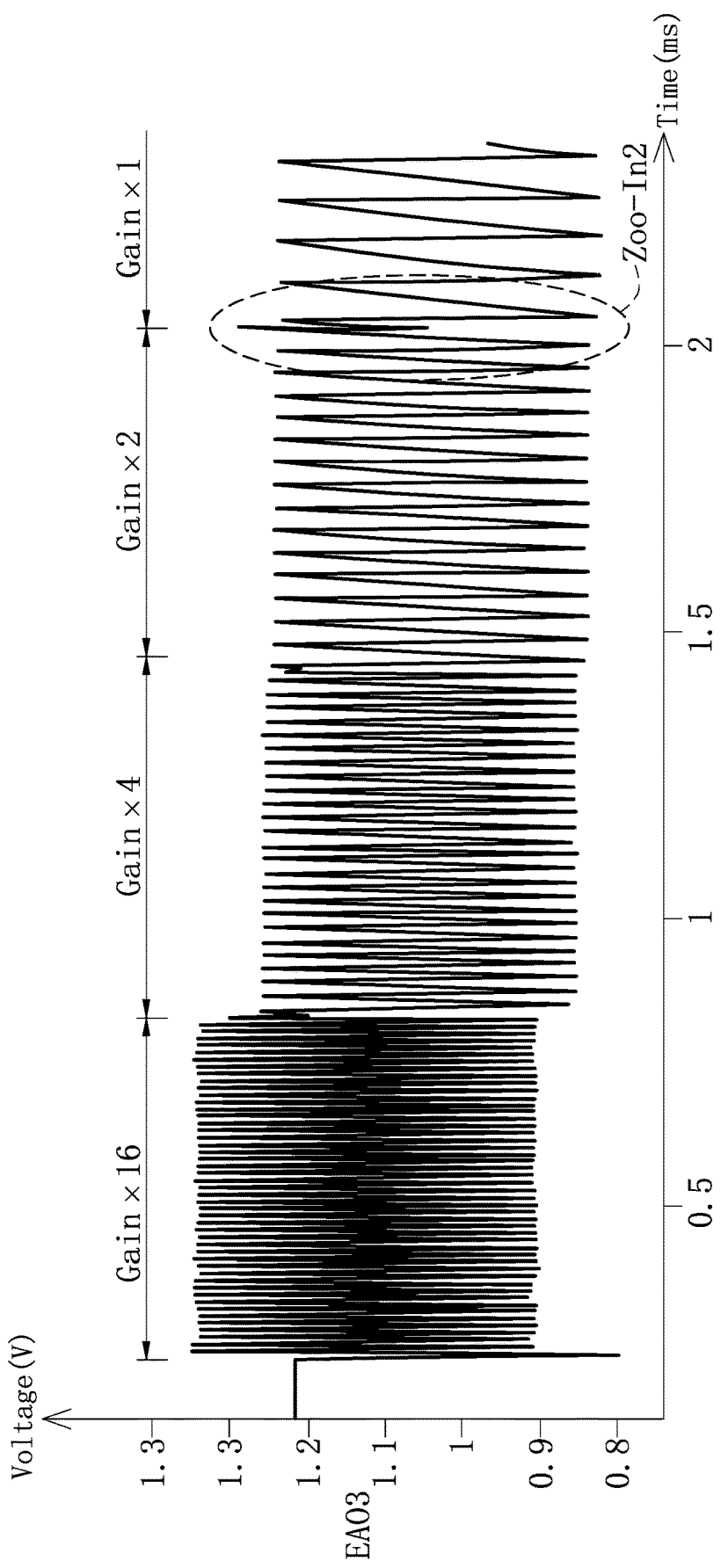
FIG. 7 is a signal waveform diagram of the error amplified signal generated by the operational amplifier when the capacitance of the variable capacitor and the current of the variable current source are modulated under a high light intensity of the ambient light source by the light sensor having the adaptively controlled gain according to the third embodiment of the present disclosure.
Figure 8:
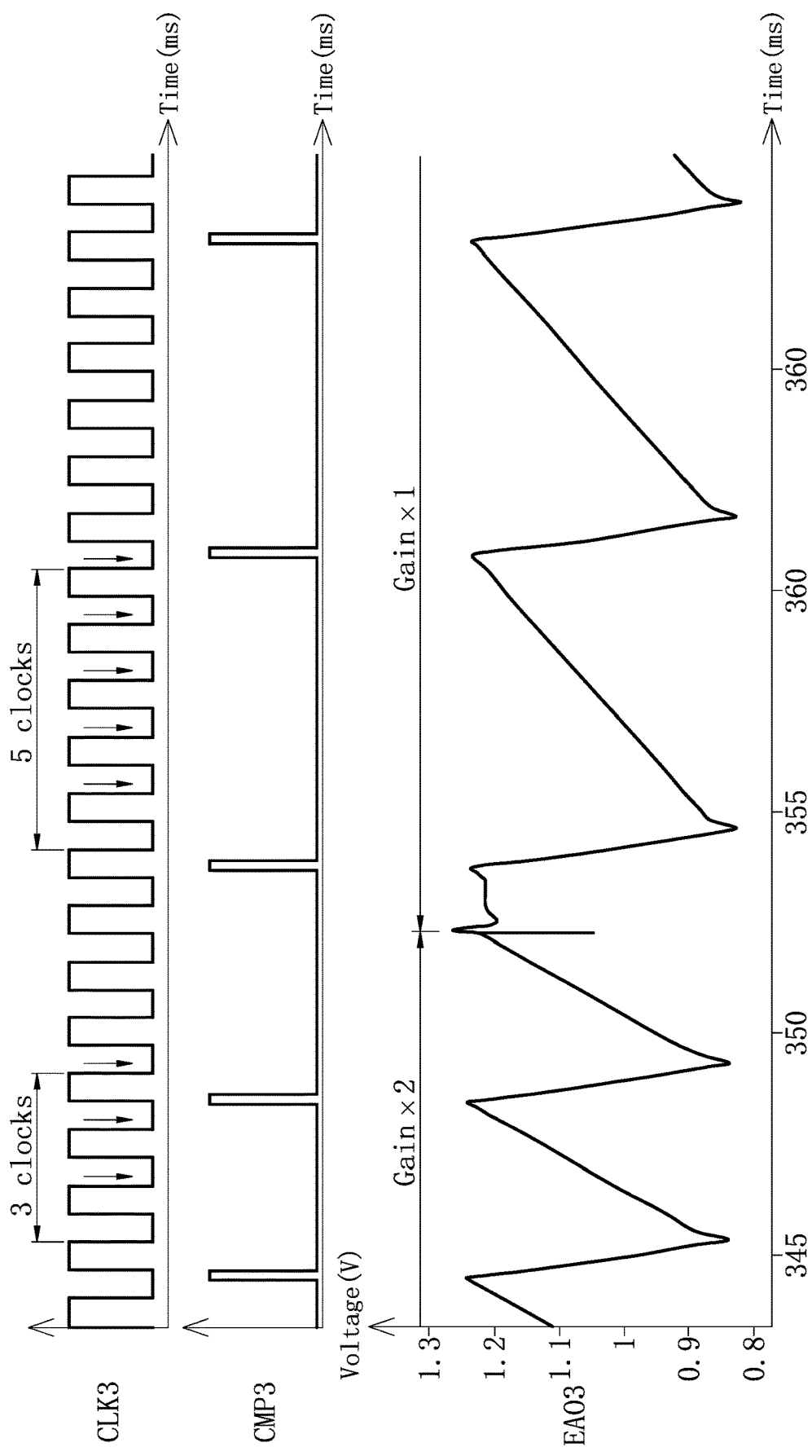
FIG. 8 is a signal waveform diagram of a clock signal received by the adaptive gain control circuit, a comparison signal generated by the comparator and the error amplified signal generated by the operational amplifier when the capacitance of the variable capacitor and the current of the variable current source are modulated under the high light intensity of the ambient light source by the light sensor having the adaptively controlled gain according to the third embodiment of the present disclosure.

Reference is made to FIGS. 3, 4, 5, 6 and 7, wherein FIG. 7 is a signal waveform diagram of an error amplified signal generated by an operational amplifier when the capacitance of the variable capacitor and the current of the variable current source are modulated under a high light intensity of the ambient light source by the light sensor having the adaptively controlled gain according to the third embodiment of the present disclosure; FIG. 8 is a signal waveform diagram of a clock signal received by the adaptive gain control circuit, a comparison signal generated by the comparator and the error amplified signal generated by the operational amplifier when the capacitance of the variable capacitor and the current of the variable current source are modulated under the high light intensity of the ambient light source by the light sensor having the adaptively controlled gain according to the third embodiment of the present disclosure. FIG. 8 is an enlarged schematic diagram of a portion of the error amplified signal EAO3 that is circled by a dotted circle Zoo-In2 as shown in FIG. 8.

It is worth noting that the signal waveforms shown in FIGS. 5 and 6 are generated by the circuit elements included in the light sensor, after the capacitance of the variable capacitor C3 and the current of the variable current source IREF3 are reduced under the relatively low light intensity of the ambient light source by the light sensor. In contrast, the signal waveforms shown in FIGS. 7 and 8 are generated by the circuit elements included in the light sensor, after the capacitance of the variable capacitor C3 and the current of the variable current source IREF3 are increased under the relatively higher light intensity of the ambient light source by the light sensor.

As shown in FIGS. 7 and 8, when the ambient light source has high light intensity such that the photoelectric element PD1 rapidly discharges the variable capacitor C3 and the operational amplifier 100 rapidly charges the variable capacitor C3, the gain control circuit 502 determines that the number CLKN of the pulse waves of the clock signal CLK3 within the charging time T of the error amplified signal EAO3 is smaller than the pulse reference number PRN. Under this condition, the gain control circuit 502 outputs a capacitance increasing signal CVR3 to the variable capacitor C3 to increase the capacitance of the variable capacitor C3, and outputs a current increasing signal IVR3 to the variable current source IREF3 to increase the current of the current signal provided by the variable current source IREF3.

The smaller the modulation gain GAIN of the capacitance of the variable capacitor C3 and the current of the variable current source IREF3 is, the larger the capacitance of the variable capacitor C3 and the current of the variable current source IREF3 are, and the smaller the slope of the waveform of the error amplified signal EAO3 is.

For example, as shown in FIG. 8, the clock signal CLK has three pulse waves within the charging time T between the two adjacent pulse waves of the comparison signal CMP3 under the modulation gain GAIN of 2. More precisely, the photoelectric element PD1 discharges the variable capacitor C3 and the variable capacitor C3 is charged by the operational amplifier 100 such that the voltage of the non-inverting input terminal of the comparator 200 increases to be higher than the voltage of the reference voltage source VREF from the voltage value smaller than the voltage of the reference voltage source VREF within one time interval. As shown in FIG. 8, each waveform of the error amplified signal EAO3 rises from the valley voltage to the peak voltage and the clock signal CLK3 includes two pulse waves within the charging time interval.

The gain control circuit 502 of the adaptive gain control circuit 500 stores the pulse reference number PRN. When the number CLKN of the pulse waves of the clock signal CLK3 such as two pulse waves is smaller than the pulse reference number PRN such as five pulse waves, the adaptive gain control circuit 500 may adjust the capacitance of the variable capacitor C3 and the current of the variable current source IREF3. For example, the capacitance of the variable capacitor C3 and the current of the variable current source IREF3 are modulated from the modulation gain GAIN of 2 to the modulation gain GAIN of 1. As a result, the longer charging time T is required for the photoelectric element PD3 to discharge the variable capacitor C3 and charging the variable capacitor C3 by the operational amplifier 100. That is, the error amplified signal EAO3 has the longer charging time T.

In summary, the present disclosure provides the light sensor having the adaptively controlled gain, which includes the adaptive gain control circuit for adjusting the capacitance of the variable capacitor and/or the current of the variable current source. As a result, the time length required for charging the variable capacitor by the photocurrent that is converted from the ambient light energy by the photoelectric element is adjusted. Therefore, when the light sensor is irradiated by the ambient light source having the low light intensity, the capacitance of the variable capacitor and/or the current of the variable current source are reduced such that the time length of charging the variable capacitor is shortened, thereby improving a light sensing and conversion time of the light sensor. In addition, when the light sensor is irradiated by the ambient light source having high or drastically changing light intensity, the capacitance of the variable capacitor and/or the current of the variable current source are increased, such that the time length of charging the variable capacitor is extended. Therefore, the light sensor can more accurately count the number of the waveforms. The electronic device applied with such light sensor can more accurately determine a required resolution of a display screen of the electronic device under the preset light intensity of the ambient light source such that an image can be displayed on the display screen with a desired brightness.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light sensor having an adaptively controlled gain, comprising:
   a photoelectric element configured to convert light energy illuminating through the photoelectric element into a photocurrent;
   an operational amplifier having a first amplifier input terminal and a second amplifier input terminal respectively connected to the photoelectric element and a reference voltage source, and configured to output an error amplified signal based on a voltage difference between a voltage of the first amplifier input terminal and a voltage of the reference voltage source and a gain of the operational amplifier;
   a comparator having a first comparator input terminal and a second comparator input terminal respectively connected to an output terminal of the operational amplifier and the reference voltage source, and configured to compare a voltage of the error amplified signal and the voltage of the reference voltage source to output a comparison signal;
   an adaptive gain control circuit connected to an output terminal of the comparator and including:
      a pulse detector circuit connected to an external electronic circuit and the output terminal of the comparator, and configured to detect the comparison signal from the comparator to output a pulse detected signal and detect a clock signal from the external electronic circuit to output a clock detected signal; and
      a gain control circuit connected to the pulse detector circuit and configured to output a capacitance modulating signal according to the pulse detected signal;
   a variable capacitor connected between the output terminal of the operational amplifier and the first comparator input terminal and connected to the gain control circuit, and the variable capacitor having a target capacitance that is modulated from an original capacitance according to the capacitance modulating signal; and
   a pulse accumulator circuit connected to the output terminal of the comparator and configured to count the number of times that a voltage of the first comparator input terminal increases to be higher than the voltage of the reference voltage source from a voltage value lower than the voltage of the reference voltage source according to the comparison signal.

2. The light sensor of claim 1, wherein each time the voltage of the first comparator input terminal of the comparator increases to be higher than the voltage of the reference voltage source from the voltage value lower than the voltage of the reference voltage source, the comparator generates the comparison signal having a pulse wave;
   the pulse detector circuit detects a time interval between the two adjacent pulse waves of the comparison signal to output the pulse detected signal and detects the number of the pulse waves of the clock signal during the time interval to output the clock detected signal;
   the gain control circuit stores a pulse reference number, and when the gain control circuit determines that the number of the pulse waves of the clock signal during the time interval is not equal to the pulse reference number according to the pulse detected signal and the clock detected signal, the gain control circuit outputs the capacitance modulating signal;
   wherein the voltage of the first comparator input terminal of the comparator increases to be equal to or higher than the voltage of the reference voltage source from the voltage value lower than the voltage of the reference voltage source during the time interval.

3. The light sensor of claim 2, wherein when the gain control circuit determines that the number of the pulse waves of the clock signal during the time interval is larger than the pulse reference number, the gain control circuit outputs a capacitance reducing signal for reducing a capacitance of the variable capacitor;

when the gain control circuit determines that the number of the pulse waves of the clock signal during the time interval is smaller than the pulse reference number, the gain control circuit outputs a capacitance increasing signal for increasing the capacitance of the variable capacitor;

wherein the capacitance modulating signal includes the capacitance increasing signal and the capacitance reducing signal.

4. The light sensor of claim 1, further comprising: a variable current source connected to the gain control circuit and a terminal of the variable capacitor that is connected to the first amplifier input terminal of the operational amplifier, the gain control circuit is configured to output a current modulating signal according to the pulse detected signal or the capacitance modulating signal to the variable current source, the variable current source supplies a current having a target current value that is modulated from an original current value according to the current modulating signal to the variable capacitor to charge the variable capacitor.

5. The light sensor of claim 4, wherein each time the voltage of the first comparator input terminal of the comparator increases to be higher than the voltage of the reference voltage source from the voltage value lower than the voltage of the reference voltage source according to the comparison signal, the comparator generates the comparison signal having a pulse wave;

the pulse detector circuit detects a time interval between the two pulse waves of the comparison signal to output the pulse detected signal and detects the number of the pulse waves of the clock signal during the time interval to output the clock detected signal;

the gain control circuit stores a pulse reference number, and when the gain control circuit determines that the number of the pulse waves of the clock signal during the time interval is not equal to the pulse reference number according to the pulse detected signal and the clock detected signal, the gain control circuit outputs the current modulating signal to the variable current source;

wherein the voltage of the first comparator input terminal of the comparator increases to be equal to or higher than the voltage of the reference voltage source from the voltage value lower than the voltage of the reference voltage source during the time interval.

6. The light sensor of claim 5, wherein when the gain control circuit determines that the number of the pulse waves of the clock signal during the time interval is larger than the pulse reference number, the gain control circuit outputs a current reducing signal to the variable current source to reduce the current of the variable current source;

when the gain control circuit determines that the number of the pulse waves of the clock signal during the time interval is smaller than the pulse reference number, the gain control circuit outputs a current increasing signal to the variable current source to increase the current of the variable current source;

wherein the current modulating signal includes the current increasing signal and the current reducing signal.

7. The light sensor of claim 5, further comprising: a switch element connected between the variable capacitor and the variable current source, before the gain control circuit outputs the capacitance modulating signal for modulating the capacitance of the variable capacitor, the gain control circuit outputs the current modulating signal for modulating the current of the variable current source and turns on the switch element to allow the modulated current having the target current value to flow to the variable capacitor through the switch element.

8. The light sensor of claim 1, further comprising:

a logic circuit connected between the comparator and the pulse accumulator circuit and configured to receive the comparison signal for the comparator and convert the comparison signal into a logic signal to be outputted to the pulse accumulator circuit.

9. The light sensor of claim 1, further comprising:

a pulse storage circuit connected to the pulse accumulator circuit, and configured to store the number of times that the voltage of a voltage waveform of the first comparator input terminal of the comparator increases to be higher than the voltage of the reference voltage source from the voltage value lower than the voltage of the reference voltage source from the pulse accumulator circuit.

\* \* \* \* \*